Sept. 26, 1967 R. S. SIEGLER ETAL 3,343,366
SPARK DISCHARGE MONITORING DEVICE
Filed Nov. 25, 1958 2 Sheets-Sheet 1
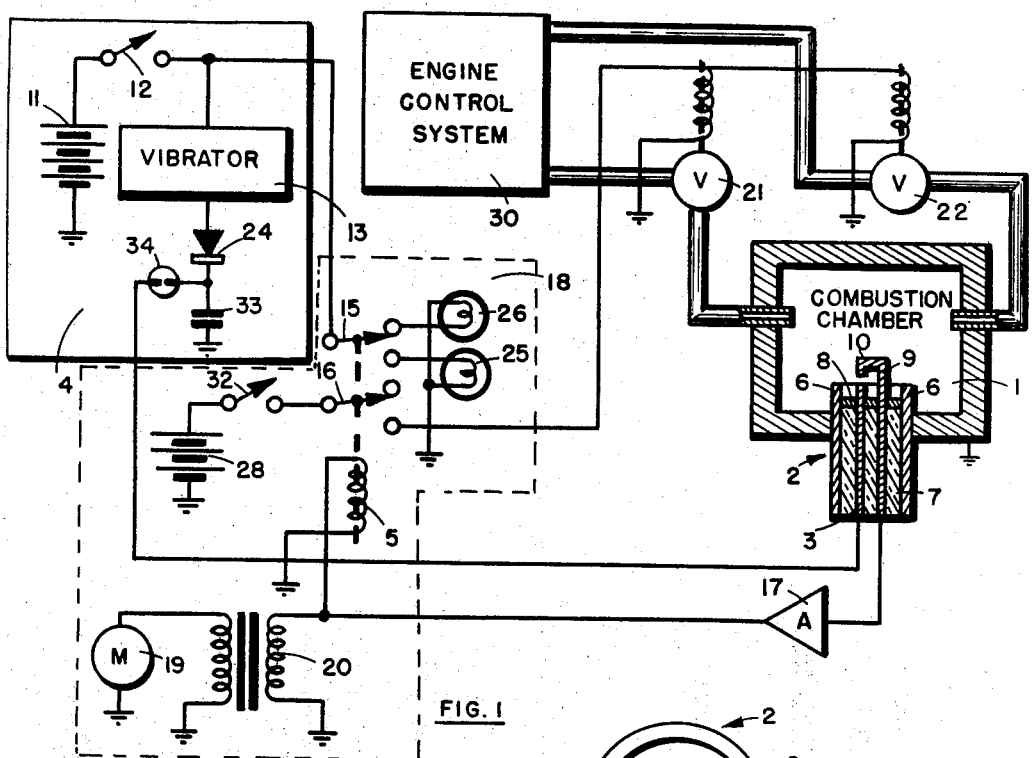
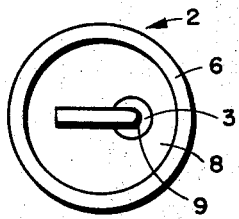
FIG. 2
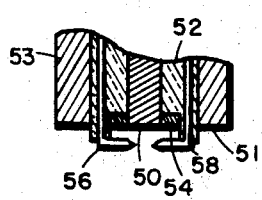
FIG. 4
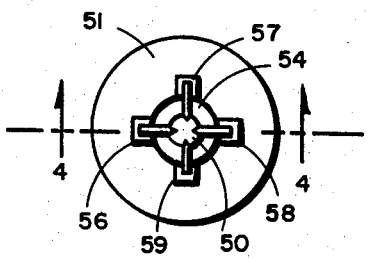
FIG. 5
INVENTORS.
ROBERT S. SIEGLER
JOHN P. LUCIANI
BY John A Duffy
AGENT

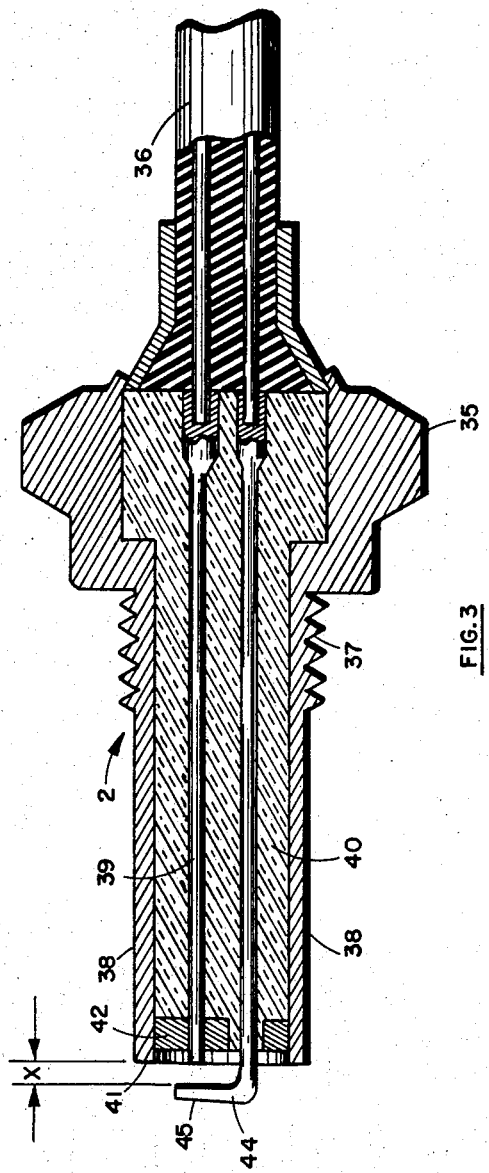

3,343,366
SPARK DISCHARGE MONITORING DEVICE
Robert S. Siegler and John P. Luciani, Canoga Park, Calif., assignors to North American Aviation, Inc.
Filed Nov. 25, 1958, Ser. No. 776,368
19 Claims. (Cl. 60—39.82)

This invention relates to spark discharge devices and more particularly to an integral spark discharge system for monitoring the spark generated in a spark plug.

In the modern development of combustion engines such as used in jet engines and the like and also in advanced rocket engines there is often employed a spark discharge device for igniting the fuel in the combustion chamber of the engine. Modern-day jet engines and rocket engines used in guided missiles require a firing system which is highly reliable. Accordingly, some means are required for determining the operability and reliability of the spark discharge devices used therein. For example, in a rocket engine which employs a mixture of alcohol and liquid oxygen as the fuel wherein the alcohol and liquid oxygen are combined in a combustion chamber with ignition initiated by a spark plug, it is necessary to determine instantaneously and accurately the nature of the spark provided by the spark plug. A low energy spark or no spark at all creates the possibility of an explosion in the combustion chamber if remedial measures are not undertaken immediately. Further, in jet engines utilizing spark plugs to initiate combustion, it is often necessary to determine in flight or on the ground without having to take the spark discharge device out whether or not the spark discharge device is operating effectively. Thus there is an apparent need for a monitoring device for determining the existence of a spark and the amount of energy in the spark.

Devices for testing spark plugs are well known in the art. The common way of testing a spark discharge device such as the common spark plug found in today's automobiles is to remove the spark plug and test it with testing machines provided in repair shops. It may readily be seen that in the advanced engine systems provided in airplanes, missiles, and the like it is not always feasible nor often even possible to remove the spark plug from the engine. Accordingly, testing means which require the removal of the spark plug from the engine are inadequate to meet present-day applications in many cases.

One way of measuring or monitoring the spark in a spark plug without removing the spark plug is to measure the current between the high potential and low potential electrode in the spark plug. This is commonly done by inserting a resistor in series with the electrodes and measuring the current through said resistor. Because of the inherent high currents and short duration of the spark it is necessary to have a very specialized resistor in order to effectively measure the energy of the spark. In addition, current dissipated in the measuring resistor greatly affects the energy developed in the spark plug in order to create the spark. Further, measuring systems which depend on a series measuring device are not reliable since it is well known that a short circuit between the high potential and low potential electrode of a spark plug will cause a resistor in series therewith to measure current, thus giving a false output signal. Therefore, the device does not insure that a spark actually was produced in the spark plug. Other methods such as those employing photosensitive devices and devices for measuring the heat of the spark plug meet with similar objections in that they are neither reliable, repeatable, efficient, nor of simple enough construction for today's requirements.

The device of this invention provides an efficient, reusable, and completely reliable spark monitoring system for measuring both the existence of a spark in a spark discharge device and the energy in such spark. A monitor probe is provided which is constructed integral with the other electrodes in the spark discharge device for measuring the spark created by the spark discharge device. By making use of well known principles associated with the creation of a spark in the spark discharge device and spacing the monitoring electrode in predetermined relation with the high potential and low potential electrode in a spark discharge device, the energy in the spark created thereby can be measured in a highly reliable and accurate manner.

It is therefore an object of this invention to provide an improved spark plug.

It is another object of this invention to provide a means for monitoring a spark discharge device.

It is a further object of this invention to provide a means for indicating positively the fact whether a spark was created in a spark discharge device.

It is a further object of this invention to provide means for measuring the energy created across the spark gap of a spark discharge device.

It is a still further object of this invention to provide means for indicating the current in the spark of a spark discharge device.

It is another object of this invention to provide a spark monitoring electrode for indicating a spark in a spark discharge device.

It is still another object of this invention to provide a spark plug monitoring system.

Other objects of this invention will become apparent from the following description taken in connection with the accompanying drawings in which:

FIG. 1 is a block diagram illustrating one application of the principles of this invention.

FIG. 2 is a top view of one embodiment of the spark discharge device 2 of FIG. 1.

FIG. 3 is a view, in section, of one embodiment of the spark discharge device of this invention.

FIG. 4 is a view in section of another embodiment of the device of this invention illustrating the principle of having more than one monitoring electrode.

FIG. 5 is a plan view of the embodiment illustrated in FIG. 4.

According to the principles of the device of this invention as illustrated in the embodiments shown, a spark discharge device is provided having a high potential electrode and a low potential electrode responsive to a source of potential for creating a spark across the electrodes. The sparking portion of the igniter, which may be either an air gap or a gap provided by semiconductive material, is provided between the high potential and the low potential electrodes. Monitoring of the spark created is provided by the inclusion of a monitor electrode which is integral with the high potential and low potential electrodes in the spark discharge device. Suitable insulation is provided to prevent undesirable leakage between the high and low potential electrodes and the monitoring electrode. The monitor electrode is spaced in such a relationship to the high potential electrode as to provide a nonsparking current path between the high potential electrode and the monitoring electrode. The nonsparking current path or gap has a current flowing therein which is proportional to the current, and thereby also to the energy, in the spark between the high potential and the low potential electrode. Means are provided for shielding the monitoring probe from extraneous signals and an amplifier amplifies the proportional current signal produced by the monitoring probe. The output of the amplifier produces a signal which is proportional to the energy in the spark between the high potential and the low potential electrode.

Turning now to FIG. 1, there is shown a block diagram illustrating the application of the spark discharge device of this invention in a typical engine system to provide a monitor system. In FIG. 1 combustion chamber 1, which may be for example the gas generator in a typical rocket engine, has a fuel and oxidizer combination therein which is ignited by a number of spark plugs, one of which is shown as spark discharge device 2. The fuel and oxidizer combination are respectively fed into chamber 1 through suitable solenoid operated propellant valves 21 and 22. Spark discharge device 2 has a high potential electrode 3 connected to receive a high potential from ignition exciter 4. Ignition exciter 4 may be of any type of standard ignition system and may include, for example, a battery 11 connected through the ignition switch 12 to a suitable means for stepping up the voltage of the battery, such as a vibrator 13. The high potential output of vibrator 13 is in turn connected through diode 24 to charge a capacitor 33. The diode 24 is also connected to a sealed gap 34. Capacitor 33 receives a charge from vibrator 13 and discharges to provide the high potential to electrode 3. Low potential electrode 6 is grounded by suitable means through a fixed gap, for example to the outside of chamber 1. Suitable insulating material 7 is provided between and circumferentially wound around electrodes 3 and 6 to prevent undesirable electrical leakage. A spark gap is created by the inclusion of semiconductive material 8 suitably located between electrodes 3 and 6. Upon application of a high potential to electrode 3 a spark is created across the face of semiconductive material 8 and the surrounding region by action well known in the spark plug art. Ionization of the atmosphere occurs across semiconductive material 8 and in close proximity thereto. Thus some ionization of the molecules in the surrounding atmosphere in the combustion chamber occurs. To measure this ionization which is proportional to the arc created between electrodes 3 and 6 monitor electrode 9 is provided. Monitor electrode 9 is constructed integral with electrodes 3 and 6 in spark discharge device 2 and suitably insulated therefrom by insulation material 7. Monitor electrode 9 has a bent tip portion, shown for example as L-shaped structure 10 in FIG. 1, which is placed in the ionized region of the spark described above. A small current is created between the high potential electrode 3 and monitoring electrode 9 when a spark occurs between electrodes 3 and 6. The ionization existing between electrodes 3 and 9 is not of sufficient strength to have any appreciable effect on the spark across the gap between 3 and 6. The tip 10 of monitor electrode 9 is suitably spaced so as not to interfere with the desired spark created between electrode 3 and electrode 6. Thus the energy removed from the spark by the current created between electrode 3 and electrode 10 is not of sufficient magnitude to substantially affect the spark. Amplifier 17 amplifies a small current measured by electrode 9 and feeds the result to a suitable control center 18. Control center 18 discriminates between proper and improper operation of the spark discharge device and supplies the necessary control signals to the remainder of the engine system. For example, control center 18 may include a suitable means for measuring the energy of the spark created which may be a meter 19 which measures a current directly proportional to the energy of the spark created between electrodes 3 and 6. Meter 19 receives the output signal from amplifier 17 through current transformer 20. Control center 18 also may include relay 5 whose energizing coil is responsive to a signal of predetermined strength from amplifier 17. Contacts 15 of relay 5 are connected when energized to illuminate a light 25 indicating that a spark of desired strength has been created. Contacts 15 are connected when de-energized to illuminate light 26 indicating no spark or a spark of insufficient strength has been created. Contacts 16 are connected when de-energized to prevent normally closed valves 21 and 22 from opening. Suitable D-C operating potentials are provided for relay 5 and associated controls from battery 11 through igniter switch 12. Contacts 16 receive an operating potential from a suitably battery 28 through disconnecting switch 32.

In the schematic diagram shown in FIG. 1 a reliable and efficient means is provided for monitoring the spark produced in spark discharge device 2 providing positive control to determine first whether a spark in fact occurred and whether the energy of the spark was sufficient as required by combustion chamber 1. The simple yet highly reliable features of including a monitor probe such as electrode 9 integral with the high potential and low potential electrodes of spark dicharge device 2 provide for a striking improvement in the spark plug art.

In operation, in the beginning, ignition switch 12 is actuated for a predetermined time. Ignition exciter 4 provides electrode 3 of spark plug 2 with a sufficiently high potential to create a spark across the gap provided to electrode 6. If a spark of predetermined strength occurs amplifier 17, responsive to the current between electrode 3 and electrode 9, provides a signal of sufficient strength to energize the coil of relay 5. Contacts 15 when energized illuminate light 25 indicating that a spark of sufficient strength was created. Contacts 16 when energized close the circuit, supplying potential to the solenoids of normally closed valves 21 and 22 thereby maintaining the valves open. Thus when monitor electrode 9 is sensing proper spark plug operation valves 21 and 22 remain open, meter 19 measures the strength of the spark and light 25 indicates that a spark of sufficient strength was created.

If monitor electrode 9 does not sense a proper strength spark or if during the period of the actuation of switch 12 there is received initially a proper signal from electrode 9 which then drops below the predetermined value, relay 5 is de-energized. Contacts 16 when de-energized close valves 21 and 22 preventing the supply of any more fuel or oxidizer to combustion chamber 1 until a spark is created. Until disconnecting switch 32 is opened, valves 21 and 22 will remain closed preventing any dangerous mixture of fuel and oxidizer in combustion chamber 1. The electrical circuit in FIG. 1 which measures the flow of current across the gap between electrodes 3 and 9 which includes the high potential from exciter 4, high potential electrode 3, monitor electrode 9 and ground may be modified if desired to provide an independent source of potential. For example, a battery of low potential such as 28 v. could be provided so as to have its positive terminal connected in series with a suitable resistor and tip 10 of electrode 9. The other side of electrode 9 could then be connected to amplifier 17. In operation a current flowing across the gap between electrode 3 and electrode 9 would increase the flow of current in the electrical circuit through electrode 9.

In FIG. 2 there is shown a top view of the discharge device 2 of FIG. 1. Electrodes 3 and 6 form a radial band around the center of discharge device 2 to provide for an even spark. Semiconductive material 8 also forms a radial band around the center of device 2 to induce the spark. Monitor electrode 9 is selected of predetermined width and suitably spaced as shown.

Turning now to FIG. 3, there is shown one embodiment of the invention illustrating the construction of discharge device 2. As shown in FIG. 3 cylindrically constructed spark discharge device 2 includes an enlarged portion 35 adapted to receive a cable 36 which has the electrical input and output leads included therein. Threaded sleeve 37 is adapted to engage the threads of a conventional spark receiving part in a combustion chamber. Integral with portions 35 and 37 and forming a part thereof is a suitable steel shell 38 which operates to form the low potential electrode of discharge device 2. Conductive electrode 39, functioning as the high potential electrode of the device is located approximately in the center of device 2 and disposed transversely therein, being connected by a suitable electrical connector to a conductor in cable 36. Electrode 39 is electrically insulated from the shell 38 by suitable insulating material 40 well known in the spark plug art. Both ground electrode 38 and high potential electrode 39 have one end exposed at a predetermined distance from the face 41 of discharge device 2 thereby providing an air gap at the tip thereof. A typical dimension for the air gap may be .062±.005 inch. Semiconductive material 39 and such as metallic oxide is placed between electrodes 39 and 38 at a suitable location near face 41 to provide a comparatively low resistance path for the discharge of high potential electrode 39 to low potential electrode 38. Monitor electrode 44 is provided suitably spaced from electrodes 38 and 39 and insulated by insulation material 40. Monitor electrode 44 is constructed of suitable electrically conductive material such as tungsten steel and terminates at one end in insulation 40 and has a bent tip portion or probe 45. Probe 45 which is a conductive electrode terminates in the proximity of electrode 39. Probe 45 is spaced from electrode 39 so as to be close enough to be in the region of ionized atmosphere caused by the spark across the face of conductive material 42. Typical spacing includes a clearance $x$ as shown in FIG. 3 equal to .060±.005 inch. This dimension is such that probe 45 is close enough to electrode 39 to be in the ionized region yet far enough away to prevent a spark occurring between 39 and 44.

Turning now to FIGS. 4 and 5, there is shown an alternative embodiment of the invention illustrating specifically the use of a plurality of monitoring electrodes. In FIG. 4, a partial vertical sectional view of the device, there is included four monitor electrodes 56, 57, 58, and 59. For simplification of the drawing, only electrodes 56 and 58 are shown in FIG. 4. As shown in FIG. 5, a plan view of the device, electrodes 56, 57, 58 and 59 are symmetrically arranged in a circle about a center electrode 50. As shown in FIG. 4, electrodes 56–59 each extend exteriorly of the face 51 of spark discharge device 52. Low potential electrode 53 forms the outside shell of device 52. Semiconductive material 54 provides a comparatively low resistance leakage path between electrodes 50 and 53. The tips or probes of monitor electrodes 56–59 extend exteriorly of face 51 and terminate in close proximity to electrode 50 to provide a leakage path for the flow of non-sparking current from electrode 50 to electrodes 56–59.

Upon ignition a spark is generated across semiconductive material 54 between high potential electrode 50 and low potential electrode 53. The ionization of the immediately surrounding atmosphere creates a plurality of current paths between electrode 50 and electrodes 56–59. The provision of a plurality of monitoring electrodes such as the four shown in FIGS. 4 and 5 provides for a more even flow of current and a more accurate and reliable measure of the spark by the monitor electrode than is provided by having only one monitor electrode. It may readily be seen that any number of monitor electrodes may be utilized suitably spaced according to the teaching of FIG. 3 and FIG. 4.

Although this invention has been described and illustrated in detail, it is to be clearly understood that the same is by way of illustration and example only and is not to be taken by way of limitation, the spirit and scope of this invention being limited only by the terms of the appended claims.

We claim:

1. In a spark discharge device for insertion in a combustion chamber the combination of a high potential electrode, a low potential electrode spaced from said high potential electrode to provide a sparking current path, electrical means including a source of electrical potential for generating an ionized region between said high potential and said low potential electrodes, said ionized region having a sparking current and a non-sparking current flowing therein, a monitor electrode means for continuously detecting the magnitude of said sparking current spaced from said high potential electrode in said ionized region to provide a current path proportional to said magnitude for said non-sparking current, and means for indicating current in said current path.

2. In a spark discharge device for insertion in a combustion chamber the combination of a high potential electrode, a low potential electrode spaced from said high potential electrode to provide a spark gap, a source of electrical potential, said high potential electrode and said low potential electrode connected to be responsive to said source of electrical potential whereby an ionized region is generated across said spark gap when said source is applied across said high potential electrode and said low potential electrode, and a monitor electrode means for continuously detecting the magnitude of energy in said ionized region, said monitor electrode means spaced from said high potential electrode and in said ionized region to provide a non-sparking gap, whereby a current is generated across said non-sparking gap which is proportional to said magnitude when said ionized region is generated, and means for measuring current generated across said non-sparking gap.

3. A spark discharge and monitoring device for insertion in a combustion chamber comprising a high potential electrode, an electrical insulating material disposed about said electrode, said high potential electrode having one end exposed exteriorly of said insulating material, a low potential electrode separated from said high potential electrode by said insulating material, said low potential electrode having one end exposed exteriorly of said insulating material and adjacent said one end of said high potential electrode, semiconductive electrical means structurally fixed with respect to said high potential and low potential electrodes to provide a sparking current discharge path and a non-sparking current discharge path therebetween, and a monitor monitoring means for continuously detecting the magnitude of said non-sparking current, said monitoring means including a monitor electrode which is separated from said high potential and said low potential electrodes by said insulating material, one end of said monitor electrode being in close proximity with said high potential electrode to be outside of said sparking current path and within said non-sparking current path.

4. In a device for discharging and monitoring an ignition spark in a combustion chamber the combination of high potential and low potential electrodes, a monitoring electrode means, means for spacing and insulating said electrodes and said monitoring electrode means, said high potential and low potential electrodes each having an end exposed from said insulation means and said monitoring electrode means to provide a spark gap therebetween, said monitoring electrode means extending outside said insulating means and having a perpendicular bent tip extending above and in parallel with said spark gap for continuously detecting the magnitude of the amount of energy therein, said bent tip terminating in close proximity with said high potential and low potential electrodes whereby a non-sparking current path is provided between said high potential electrode and said monitoring electrode means upon ignition of said spark.

5. An integral device for discharging and monitoring an ignition spark in a combustion chamber comprising a high potential electrode, a low potential electrode, means for applying a source of potential across said high potential and low potential electrodes for creating said spark, means for insulating said high potential electrode from said low potential electrode, said high potential and said low potential electrodes each having an end exposed from said insulating means, said exposed ends of said high potential and low potential electrodes having interposed therebetween semiconductive material whereby a gap is provided, a monitor electrode means for continuously detecting the magnitude of the amount of energy in said spark, means for insulating said monitor electrode from said high potential and low potential electrodes, said monitor electrode means having a bent tip portion extending over a portion of said insulating means into close proximity with said high potential electrode.

6. A spark monitor system comprising a spark plug for insertion in a combustion chamber, said spark plug having a high potential electrode, a low potential electrode, and a monitor electrode means, said combustion chamber connected to receive a mixture of fuel and oxidizing means, means for controlling the flow of said fuel and oxidizing means into said combustion chamber, said high potential and low potential electrodes constructed and arranged to provide a spark gap therebetween for effecting an ignition spark therein to ignite said mixture, said monitor electrode means constructed and arranged adjacent to said spark gap to provide a signal indicating the magnitude of energy of said spark, said flow control means responsive to said signal whereby the flow of said mixture is permitted only upon indication of a predetermined magnitude of said spark.

7. In a spark discharge device having an elongated metal shell, an elongated insulator extending longitudinally of the shell, a longitudinally extending conductor in the insulator, and a spark gap between the conductor as a first electrode and the shell as a second electrode at the second, forward end of the device, the improvement which comprises monitor means for detecting spark discharges between the electrodes at said gap, said monitor means comprising a monitoring probe electrode overlying and spaced from the spark discharge gap, electrically insulating means mounting the probe electrode on the device, a terminal means on the shell and insulated therefrom adjacent the rear end thereof, a contact in said terminal means, and an electrical lead electrically isolated from the shell extending from the probe electrode in a rearward direction within the shell to the contact of said terminal means.

8. In a spark discharge device having an elongated metal shell, an elongated electrically insualting means extending longitudinally of the shell, a longitudinally extending conductor in the insulating means, and a spark gap between the conductor as a first electrode and the shell as a second electrode at the second, forward end of the device, the improvement which comprises monitor means for detecting spark discharges between the electrodes at said gap, said monitor means comprising a monitoring probe electrode overlying and spaced from the spark discharge gap, a portion of said electrically insulating means mounting the probe electrode on the device, a terminal means on the shell and insulated therefrom adjacent the rear end thereof, a contact in said terminal means, and an electrical lead electrically isolated from the shell extending from the probe electrode in a rearward direction within the shell to the contact of said terminal means.

9. A spark discharge device as claimed in claim 8, wherein the terminal means comprises a contact connected to the electrical lead mounted within and spaced from and insulated from the housing.

10. A sensing igniter, including means defining an elongated spark gap closed at one end and open at the other, said means comprising two electrodes adjacent the closed end of the gap and adapted for electrical connection to a source of electrical energy effective at times to initiate a spark across the gap, and spark sensing means comprising a third electrode at the open end of the gap and adapted for electrical connection to current flow sensing means.

11. A sensing igniter as defined in claim 10, in which the gap defining means includes semiconductor means closing said one end of the gap.

12. A sensing igniter as defined in claim 10, in which the gap defining means includes electrical insulating means closing said one end of the gap.

13. A sensing igniter as defined in claim 10, in which the gap is annular in cross-section and the gap defining means comprises a central one of the two electrodes extending the full length of the gap, the other of the two electrodes and the third electrode being axially aligned on the periphery of the gap, an electrical insulating means separating the third electrode from the other electrode.

14. A sensing igniter comprising an elongated cylindrical shell of electrically conductive material and open at one end, a first electrode extending axially of said shell and terminating within said open end, a second electrode between and concentric with said first electrode and said shell and terminating inwardly of said open end, means, including first electrical insulating means, separating said first and second electrodes, second electrical insulating means separating said second electrode and said shell, said separating means, said second insulating means, said electrodes and said shell cooperating to define an elongated spark gap of annular cross-section.

15. A sensing igniter as defined in claim 14, in which said first and second electrodes and said shell extend coaxially throughout the length of the igniter, and means at the other end of the shell adapted for attachment of a triaxial electrical connector.

16. A sensing igniter as defined in claim 15, including a triaxial connector attached to the other end, and a triaxial cable attached to the connector.

17. Ignition apparatus, comprising a source of electric energy, an igniter having two electrodes defining a spark gap and a third electrode adjacent the gap, means including two conductors connecting the respective terminals of the source to the two gap-defining electrodes, a third conductor connected to the third electrode, low impedance means connecting the third conductor to the source, and means responsive to the flow of current in the low impedance means.

18. Ignition apparatus as defined in claim 17, including an impedance connected in series between said one terminal of the source and its electrically connected gap-defining electrode.

19. Ignition apparatus as defined in claim 17, in which said current responsive means comprises a current transformer.

References Cited

UNITED STATES PATENTS

| | | | |
|---|---|---|---|
| 1,264,836 | 4/1918 | Meara | 313—128 X |
| 1,364,262 | 1/1921 | Faber | 313—135 X |
| 1,624,785 | 4/1927 | Fuchs | 123—169 (I.G.) |
| 1,688,697 | 10/1928 | Fischer | 158—28 |
| 2,143,048 | 1/1939 | Bellemore | 313—138 |
| 2,457,973 | 1/1949 | Blau. | |
| 2,458,974 | 1/1949 | Bauer | 324—16 |
| 2,479,888 | 8/1949 | Wyld et al. | 158—28 X |
| 2,494,788 | 1/1950 | Wetzel | 123—169 X |
| 2,578,754 | 12/1951 | Smits | 313—138 X |
| 2,743,577 | 5/1956 | Malick | 60—39.09 |
| 2,771,942 | 11/1956 | Miller | 158—28 |
| 2,797,745 | 7/1957 | Rowell. | |
| 2,817,395 | 12/1957 | Lutz et al. | 158—28 |
| 2,937,296 | 5/1960 | Logan. | |
| 2,963,620 | 12/1960 | Knudson | 315—129 X |
| 2,969,500 | 1/1961 | Andert | 313—140 X |

JULIUS E. WEST, *Primary Examiner.*

SAMUEL LEVINE, *Examiner.*

D. J. BARNARD, J. J. GILL, *Assistant Examiners.*